United States Patent [19]

Quanrud

[11] 3,731,569
[45] May 8, 1973

[54] HARVESTING MACHINE

[76] Inventor: John W. Quanrud, 1538 5th Avenue N.W., Jamestown, N. Dak. 58401

[22] Filed: May 13, 1971

[21] Appl. No.: 143,132

[52] U.S. Cl. .........83/356.3, 241/101 M, 241/186 R, 56/473.5, 280/460, 214/42 A
[51] Int. Cl.......A01d 55/00, A01d 57/00, B26d 5/20
[58] Field of Search ..........................146/107, 117 R; 56/473.5; 280/460; 214/42 R, 42 A; 83/356.1, 356.3; 241/186.2

[56] References Cited

UNITED STATES PATENTS

| 1,197,345 | 9/1916 | Cleven et al.........................214/42 A |
| 2,608,310 | 8/1952 | De Penning........................214/42 A |
| 2,667,028 | 1/1954 | Weishaar............................214/42 A |

Primary Examiner—Willie G. Abercrombie
Attorney—Merchant & Gould

[57] ABSTRACT

A harvesting machine for attachment to the discharge end of a mobile agricultural implement for common traveling movement therewith and for reception of material from the implement. A mobile frame has a receiver pivotally mounted thereon on a vertical axis, the receiver including a hood having a top wall and a peripheral wall defining an open front. A draft frame is utilized to pivotally connect the mobile frame to the implement through the receiver and permits vertical movements of the frame and parts carried thereby relative to the implement while holding the receiver against pivotal movements on said vertical axis relative to the implement.

8 Claims, 8 Drawing Figures

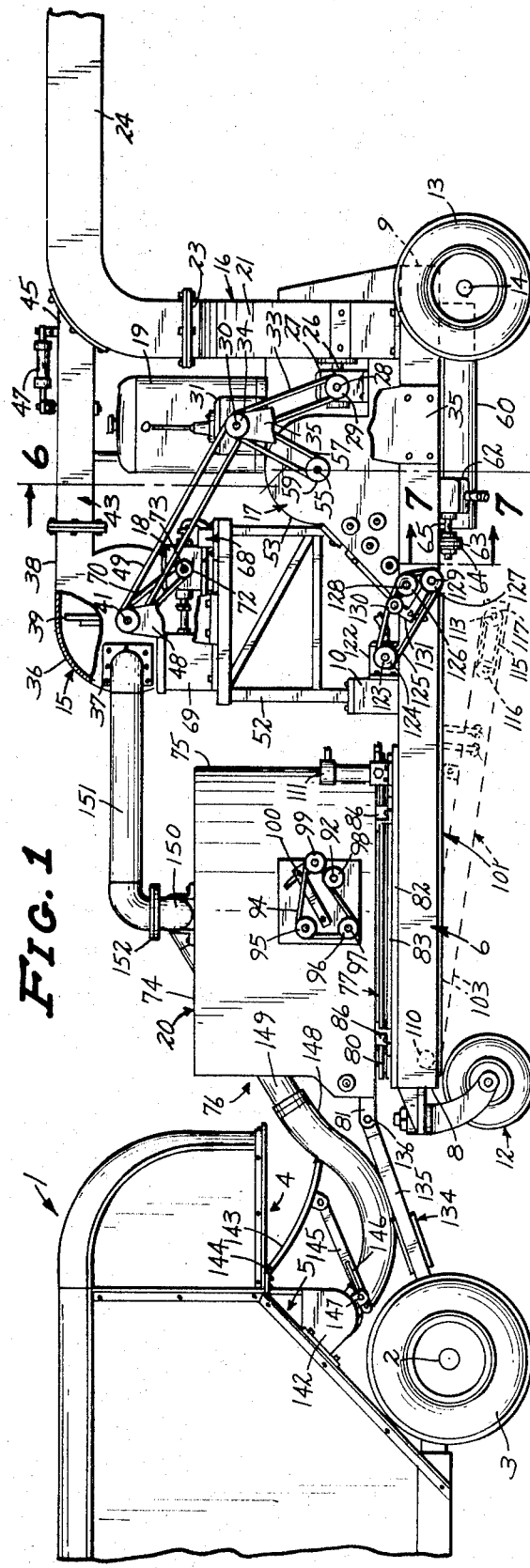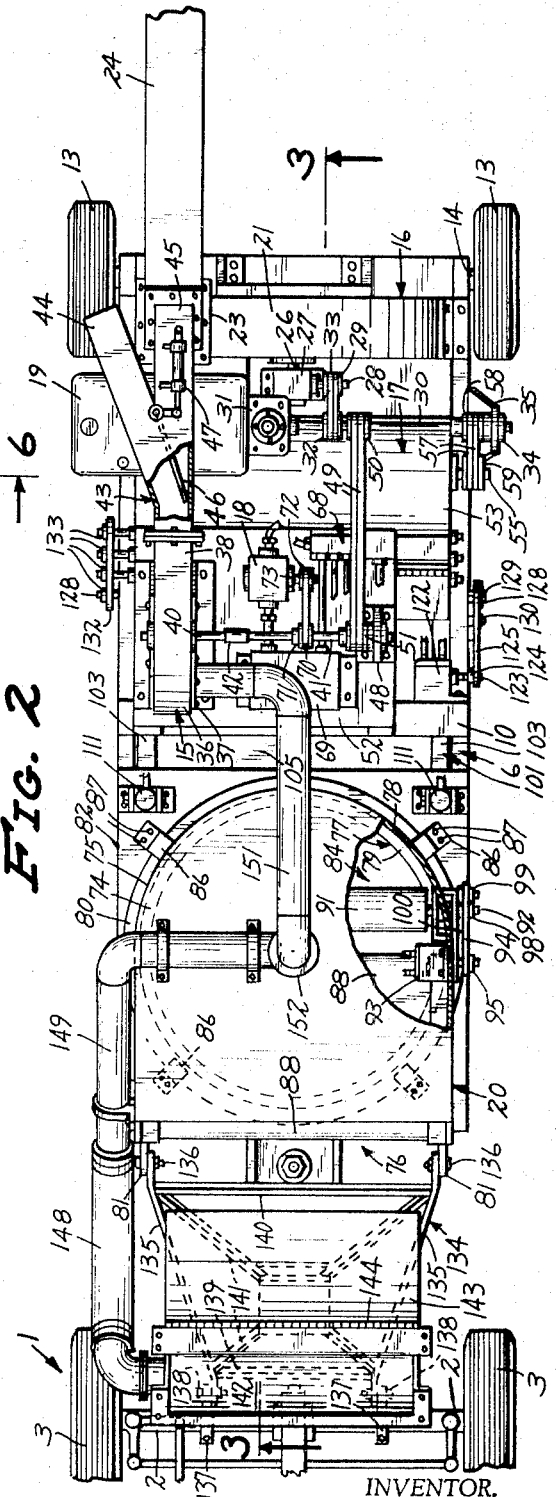

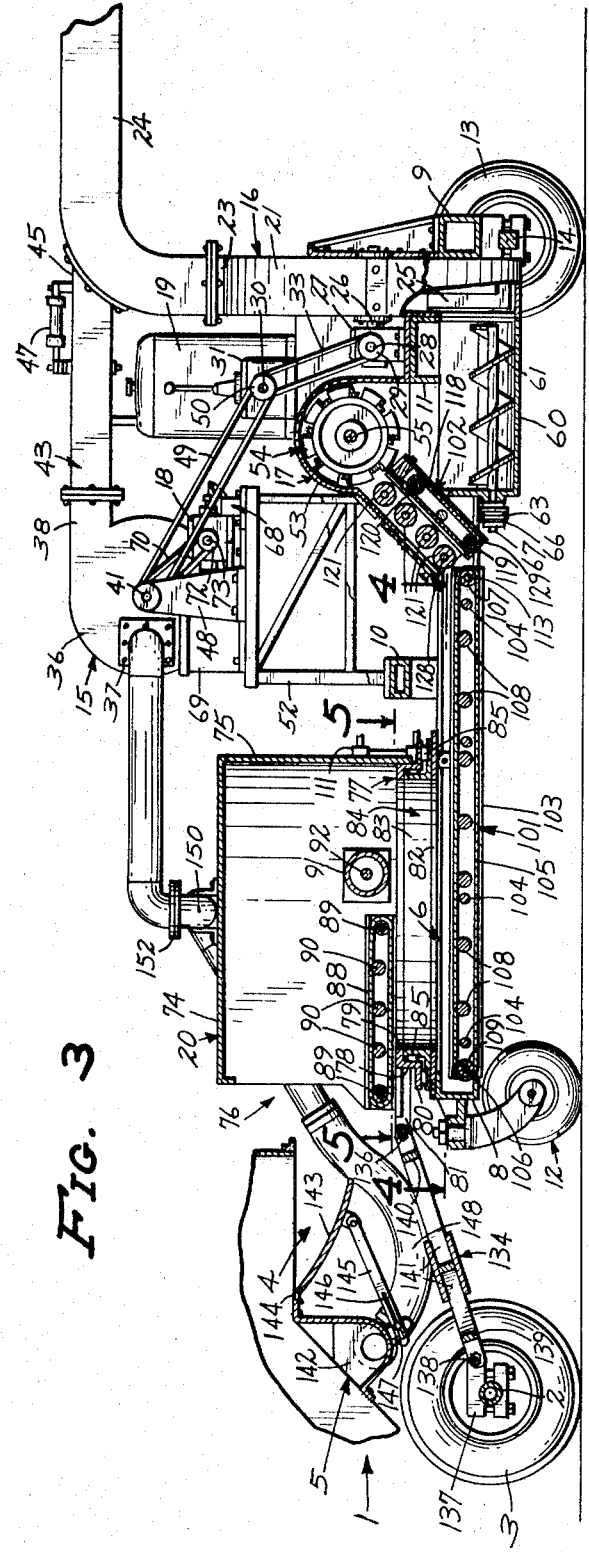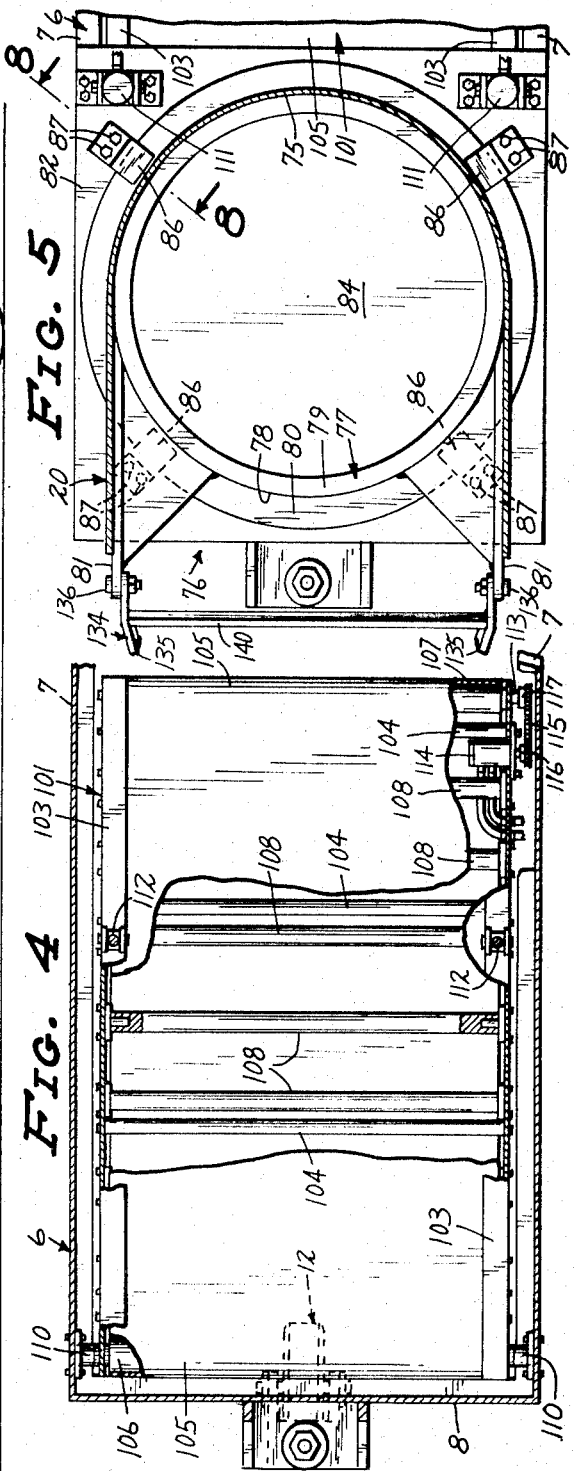
PATENTED MAY 8 1973
3,731,569
SHEET 2 OF 3
INVENTOR.
JOHN W. QUANRUD
BY
Merchant & Gould
ATTORNEYS INVENTOR.
JOHN W. QUANRUD
BY
Merchant & Gould
ATTORNEYS

HARVESTING MACHINE

BACKGROUND OF THE INVENTION

Agricultural implements, such as crop harvesters and reapers, usually separate the cracked grain, straw and chaff from crop material, and discharge the straw and chaff through a conveyor tube to a wagon for disposal, or deposit the straw and chaff on the ground rearwardly of the implement. The chaff, cracked grain, and straw has been found to have value as a stock feed, and attempts have been made to provide reapers and combines having rear discharge devices with means for collecting the otherwise lost material. Some of these devices, mounted on the implement, have added an overload to the rear end thereof, and others, being independently supported, have had difficulty in maintaining crop receiving register with the implement discharge devices when traversing rough terrain or during steering movement of the implement.

SUMMARY OF THE INVENTION

An important object of this invention is the provision of a harvesting machine having novel means for attachment to the rear straw discharge portion of an agricultural implement without adding substantial weight to the implement.

Another object of this invention is the provision of a harvesting mechanism having a material receiver which is disposed in receiving position with respect to the implement in all positions of the implement angularly with respect to the harvesting machine.

Another object of this invention is the provision of a harvesting machine as set forth having conveyor means for delivering received material to various points.

To the above ends, I provide a wheeled frame having a receiver including a hood, the receiver being mounted on the front end portion of the frame for rotation on a generally vertical axis, the receiver hood having an open front for reception of material discharged from the rear end of an agricultural implement. A conveyor is mounted in the receiver for common rotation therewith relative to the frame and for delivery of material to a second conveyor carried by the frame. The second conveyor is mounted to deliver materials selectively to treating apparatus or to the ground. Draft means for connecting the wheeled frame in trailing relation to an implement comprises a rigid draft frame having means at one end for pivotal connection to the implement on a generally horizontal axis extending transversely of the direction of travel of the implement, and means at its opposite end for pivotal connection to the receiver on an axis parallel to the pivot axis at said one end of the draft frame, the draft frame and pivotal connections holding the receiver against rotary movement on its vertical axis relative to the implement when connected to the implement.

DESCRIPTION OF THE DRAWINGS

FIG. 1 is a view in side elevation of a harvesting machine produced in accordance with this invention, and the rear end portion of an agricultural implement, some parts being broken away and some parts being shown in section;

FIG. 2 is a fragmentary view in top plan, some parts being broken away and some parts being shown in section;

FIG. 3 is a fragmentary longitudinal section, taken substantially on the line 3—3 of FIG. 2;

FIG. 4 is an enlarged fragmentary view partly in plan and partly in section, taken substantially on the line 4—4 of FIG. 3;

FIG. 5 is an enlarged fragmentary horizontal section taken substantially on the line 5—5 of FIG. 3;

DETAILED DESCRIPTION OF THE PREFERRED EMBODIMENT

Figure 6:
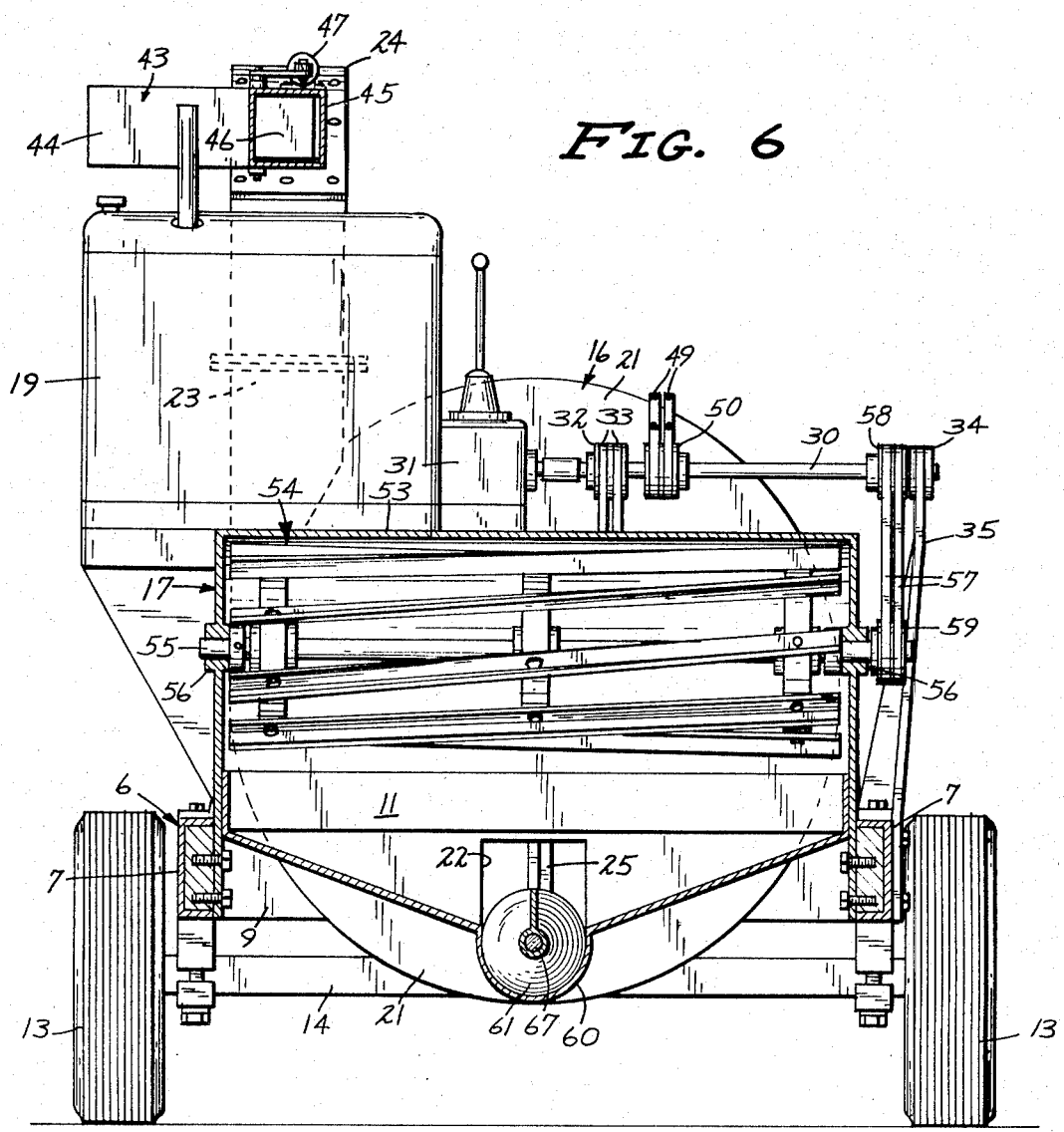
FIG. 6 is an enlarged transverse section taken substantially on the line 6—6 of FIG. 1.

In the drawings, the rear end portion of an agricultural implement, such as a threshing machine or combine, is indicated generally at 1, the same having a transverse axle 2 having pneumatic tire equipped supporting wheels 3 at its opposite ends. The lower portion of the rear end of the combine 1 is open to provide discharge opening portions 4 and 5 from which hay and chaff respectively are delivered to the ground rearwardly of the combine 1.

The machine of this invention includes a horizontal generally rectangular frame 6 comprising a pair of laterally spaced longitudinal side frame members 7, front and rear cross frame members 8 and 9 respectively, and intermediate cross frame members 10 and 11. The frame 6 is supported at its front end by a swivel or caster wheel indicated generally at 12, and at its rear end by a pair of laterally spaced tire equipped wheels 13 mounted on a transverse axle 14. The frame 6 carries a pair of blowers 15 and 16, a chopping apparatus 17, a fluid pump 18, an engine 19 for operating the blowers 15 and 16, chopper 17 and pump 18, and a receiver, indicated generally at 20. The blower 16 is mounted at the rear end of the frame 6 and involves a casing 21 having an inlet opening 22 and an outlet portion 23 to which is secured an outlet or delivery conduit 24. A rotary fan 25 is mounted on a shaft 26 journaled in suitable bearings in the casing 21, the shaft 26 being operatively connected to gears, not shown, but contained within a gear box 27 mounted on the intermediate frame member 11 and having journaled therein an input shaft 28 having mounted thereon a pulley 29. The engine 19 drives an output shaft 30 through transmission gearing within a transmission housing 31, the output shaft 30 carrying a pulley 32 over which and the pulley 29 is entrained an endless drive belt 33. As shown particularly in FIG. 2, the output shaft 30 is journaled at its outer end in a bearing 34 carried by a bracket 35.

The blower 15 comprises a housing 36 having an inlet portion 37 and an outlet portion 38, a bladed rotor 39 including a shaft 40 being journaled in the housing 36, the shaft 40 being axially aligned with and coupled to a counter shaft 41 by means of a conventional shaft coupling 42. The outlet portion 38 of the housing 36 is connected to a Y-shaped fitting 43 having diverging conduit portions 44 and 45, the former of which leads to atmosphere and the latter of which is connected to the outlet or delivery conduit 24. A valve element 46 is mounted in the fitting 43 and is operatively connected to a fluid pressure operated cylinder 47 operable to cause material discharged from the blower 15 to be directed to the branch or conduit portions 44 and 45 selectively. The counter shaft 41 is journaled in a bearing bracket 48 and is driven from the engine output shaft 30 by endless belts 49 entrained over pulleys 50 and 51 rigidly mounted on the shafts 30 and 41 respectively. In the embodiment shown, the blower 15 and pump 18 are supported from the frame 6 by a supporting frame-work or super-structure 52.

Figure 7:
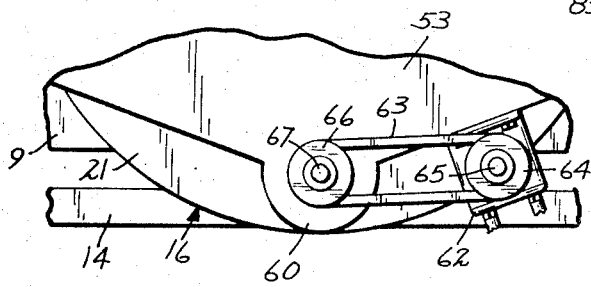
FIG. 7 is an enlarged fragmentary view in front elevation as seen from the line 7—7 of FIG. 1.

The hay chopping apparatus includes a housing 53 and a chopping rotor 54 having an axial shaft 55 that is journaled in bearings 56 in opposite ends of the housing 53. The shaft 55 is driven from the shaft 30 by endless drive belts 57 entrained over pulleys 58 and 59 mounted fast on the shafts 31 and 55 respectively. The housing 53 defines a trough like bottom portion 60 into which material chopped by the rotor 54 falls by gravity. A screw or auger conveyor 61 is mounted in the trough like bottom portion 60 and delivers material to the inlet opening 22 of the blower 16. The screw conveyor 61 is driven by a fluid pressure operated motor 62 and an endless drive belt 63 entrained over a pulley 64 on the drive shaft 65 of the motor 62 and a second pulley 66 mounted fast on a shaft 67 of the conveyor 61 and projecting axially therefrom, see particularly FIGS. 1, 3 and 7. Fluid under pressure is supplied to the motor 62 from the pump 18 through suitable connections not shown but including conventional control valve means indicated generally at 68 in FIGS. 1–3. The pump 18 is operatively connected to a fluid reservoir 69 mounted on the super-structure 52, and is driven from the counter shaft 41 by an endless belt 70 entrained over a pulley 71 fast on the counter shaft 41 and a second pulley 72 mounted on the drive shaft 73 of the pump 18.

Figure 8:
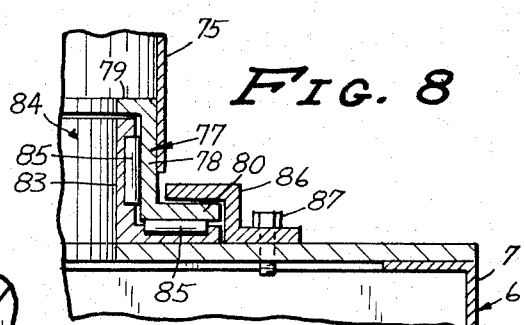
FIG. 8 is an enlarged fragmentary detail in section taken on the line 8—8 of FIG. 5.

The receiver 20 is in the nature of a hood having a top wall 74 and a peripheral wall 75 defining a front opening 76, and an annular bottom member 77 having a generally cylindrical wall portion 78 and top and bottom radial flanges 79 and 80 respectively. Further, the annular member 77 is formed to provide a pair of laterally spaced forwardly projecting arms 81, the purpose of which will hereinafter be described. Means for mounting the receiver 20 on the frame 6 comprises a relatively heavy mounting plate 82 and a mounting ring 83 welded or otherwise rigidly mounted on the plate 82, the plate 82 being securely mounted on the frame 6 by welding or other suitable means. The plate 82, mounting ring 83 and flange 79 cooperate to define a circular opening 84 for discharge of material downwardly from the receiver 20. Further, the mounting ring 83 and annular member 77 cooperate to define inner and outer races of a combination radial and end thrust bearing including circumferentially spaced rollers 85 disposed therebetween, see particularly FIGS. 3 and 8. A plurality of circumferentially spaced retainer members or clips 86 have radially inner portions that overlie the flange 80 to aid in holding the receiver in place. As shown, the clips 86 are removably secured to the mounting plate 82 by machine screws or the like 87.

The receiver 20 has mounted therein a conveyor comprising an endless conveyor belt 88 entrained over a pair of end rolls 89 suitably journaled in the peripheral wall 75, the belt 88 being supported intermediate the rolls 89 by other rolls 90, see particularly FIG. 3. Preferably, the delivery or righthand end of the upper flight of the conveyor belt 80, with respect to FIG. 3, is disposed adjacent the axis of the discharge opening 84. A feed roll 91 is journaled in rearwardly spaced relation to the rear end of the conveyor, on an axis parallel to the axis of the adjacent roll 89, and cooperates with the conveyor belt 88 to feed material downwardly through the opening 84 adjacent the axis thereof. The feed roll 91 is mounted on a shaft 92 that is suitably journaled in the peripheral wall 75, the feed roll 91 and conveyor belt 88 being driven by a fluid pressure operated motor 93 through the medium of an endless drive belt 94 entrained over a pulley 95 on the drive shaft of the motor 93, a second pulley 96 fast on the shaft 97 of an adjacent one of the conveyor rolls 89, a pulley 98 on the feed roll shaft 92 and an idler pulley 99 mounted on a bracket 100 that is suitably mounted on the peripheral wall 75 for swinging movements in directions to adjust the tension of the belt 94. It will be noted that the conveyor belt 88 and feed roll 91, being carried by the receiver 20, the belt 88 and roll 91 are free to rotate with the receiver 20 relative to the frame 6 and on the axis of the discharge opening 84.

Conveyor mechanism carried by the frame 6 comprises first and second conveyors indicated generally at 101 and 102, see particularly FIGS. 3 and 4. The first conveyor 101 includes a pair of side rails 103 each disposed in inwardly spaced relation to an adjacent one of the guide frame members 7, a plurality of transverse tie rods 104 anchored at their opposite ends to the side rails 103, an endless belt 105 entrained over front and rear conveyor rolls 106 and 107 respectively, and intermediate supporting rolls 108. The conveyor roll 106 is mounted on a shaft 109 that is journaled in bearings 110 in the side rails 7 adjacent front cross member 8, for upward and downward swinging movements of the conveyor 101 between a horizontally disposed position and a rearwardly and downwardly sloping position shown by dotted lines in FIG. 1. The conveyor 101 is movable between its horizontal and sloping positions by a pair of fluid pressure operated cylinders 111 rigidly mounted on the mounting plate 82 and cooperating piston rods 112 having their outer ends pivotally connected to the side rails 103. Fluid under pressure is supplied to the cylinders 111 from the pump 18 through the valve means 68 to raise and lower the rear end portion of the conveyor 101 by a suitable hydraulic circuitry, not shown. The conveyor roll 107 is mounted fast on a shaft 113, and is driven by a fluid pressure operated motor 114 that is mounted on one of the side rails 103, and an endless link chain 115 running over sprocket wheels 116 and 117 mounted fast on the drive shaft of the motor 114 and the shaft 113 respectively. Like the motor 93, the motor 114 is driven from the pump 18 and controlled by the control valve means 68. As shown, the conveyor belt 105 underlies the discharge end portion of the conveyor belt 88 in all positions of the receiver 20, the conveyor belt 105 being driven in a direction to deliver material rearwardly toward the second conveyor 102.

The second conveyor 102 is contained within the copper housing 53, and includes an endless conveyor belt 118 running over conveyor rolls 119 and 120 journaled in opposite end walls of the housing 53. As shown in FIG. 3, the conveyor belt 118 slopes upwardly toward the chopper rotor 54 and underlies a plurality of spaced parallel feeding rolls 121 also journaled in the opposite end walls of the chopper 53. The belt 118 and feeding rolls 121 are rotated in directions to feed material rearwardly and upwardly toward the chopping rotor 54 by a fluid pressure operated motor 122 having a drive shaft 123 which carries a pulley 124 over which is entrained an endless drive belt 125. The belt 125 runs over pulleys 126 and 127 mounted on shafts 128 and 129 extending axially outwardly from one of the feeding rolls 121 and the conveyor roll 119 respectively. An idler pulley 130 mounted on a bracket 131 is used to adjust tension of the belt 125. As shown in FIG. 2, the other feeding rolls 121 are driven from the first one thereof by a drive belt 132 running over sprocket wheels 133 on shafts of each of the feeding rolls 121 extending outwardly from the chopper housing 53, see particularly FIG. 2.

Draft means for coupling the harvesting machine to the combine or like implement 1, comprises a draft frame 134 having laterally spaced generally forward and rearwardly extending arms 135 each having a rear end portion pivotally connected to a different one of the forwardly projecting arms 81 on a common horizontal axis extending transversely of the direction of travel of the implement 1, by means of aligned pivot pins or bolts 136. At their front ends, the arms 135 are pivotally connected, on aligned axis, to mounting clamps 137, by aligned pivot pins or the like 138, the clamps 137 being adapted to be removably secured to the implement axle 2, see FIGS. 2 and 3. The draft frame 134 further includes cross members 139 and 140 and diagonal members 141, to provide a rigid coupling structure. It will be noted that the common axis of the pivot pins 138 is parallel to the common axis of the pivot bolts 136, so that the frame 6 and parts carried thereby are enabled to partake of vertical movement independently of the machine 1, so that the vehicles may traverse relatively rough ground thereof applying undue strain on the other thereof. Further, the pivotal connection between the receiver 20 and the frame 6 on a vertical axis permits the frame 6 to follow the machine 1 around corners or curves while the open front of 76 of the receiver 20 is always facing toward the discharge opening portions 4 and 5 of the combine 1 to receive material discharge therefrom.

For the purpose of directing hay and chaff toward the equipment carried by the frame 6, a gathering trough 142 is mounted in underlying relationship to the discharge opening portion 5, the trough 142 having pivotally mounted thereon a baffle or guide plate 143, as indicated at 144. The guide plate 143 is provided with a pivoted arm 145 having a slot 146 therein for reception of a locking screw 147 mounted on the trough 142, for holding the guide plate 143 in a desired position in underlying relationship to the discharge opening portion 4, as shown in FIGS. 1 and 3. A flexible conduit or tube 148 extends from one end of the trough 142, and is connected to a rigid pipe 149 rigidly mounted on the receiver 20 and having an upwardly projecting rear or discharge end 150 disposed on the vertical axis of rotation of the receiver 20 with respect to the frame 6. The end 150 of the tube or pipe 149 is connected to the front end of another tube 151 by means of a conventional swivel connection 152, the rear end of the conduit or tube 151 being connected to the inlet 37 of the blower 36.

The above described arrangement is quite flexible in its operation, disposing of material received from the machine 1 in various ways according to the wishes of the operator. By controlling the operation of the fluid pressure cylinders 111, chaff received in the receiver 20 may be disposed upon the ground in a windrow or fed to the chopper housing 53 to be reduced thereby and blown outwardly through the conduit 24 to a wagon or other point of delivery. Chaff delivered to the trough 142 may be selectively delivered to the delivery conduit 24 to be combined with material delivered thereto from the blower 16, or delivered directly to another selected point, by manipulation of the valve element 46 by the fluid pressure cylinder 47.

While I have shown and described a commercial embodiment of harvesting machine, it will be understood that the same is capable of modification without departure from the spirit and scope of the invention, as defined in the claims.

What is claimed is:

1. A harvesting machine comprising:
    a. a mobile frame structure having front and rear ends;
    b. crop material conveying and treating mechanism carried by said frame structure and including a receiver mounted on the frame structure adjacent its front end for pivotal movements on one thereof relative to the other thereof on a generally vertical axis, and a conveyor mounted in said receiver for common movement therewith relative to the frame structure, said conveyor having a material receiving end portion and an opposite delivery end portion in said receiver;
    c. draft means including a draft frame for connecting the frame structure in trailing relationship to a mobile implement and disposing said receiver in a position to receive material from said implement;
    d. said draft means further including pivotal connections between said draft frame and said implement and between said draft frame and said receiver on parallel generally horizontal axes extending transversely of the direction of travel of said implement and mobile frame structure, said draft means holding said receiver against pivotal movements on said vertical axis relative to the implement;
    e. and wheel means supporting said mobile frame structure and including a caster wheel adjacent the front end of said frame structure.

2. The harvesting machine defined in claim 1 characterized by a feed roll journaled in said receiver adjacent said delivery end of the conveyor for feeding and directing crop material downwardly from said delivery end of the conveyor.

3. The harvesting machine defined in claim 2, in which said crop conveying and treating means includes a second conveyor and mounting means mounting said second conveyor on the frame structure, said second conveyor extending generally longitudinally of the direction of travel of the frame structure and having a front end portion underlying the delivery end of said first mentioned conveyor for reception of crop material therefrom and for delivery of said material rearwardly of the frame structure.

4. The harvesting machine defined in claim 3 in which said mounting means comprises a pivot shaft at the front end of said second conveyor pivotally mounting the second conveyor at its front end to the frame structure on a horizontal axis extending transversely of said second conveyor and frame structure for swinging movement of the second conveyor between generally horizontal and downwardly rearwardly sloping positions.

5. The harvesting machine defined in claim 4 characterized by power operated means for moving the second conveyor between said generally horizontal and downwardly rearwardly sloping positions.

6. The harvesting machine defined in claim 1 in which said receiver includes a hood having a top wall and a peripheral wall defining a front opening, said conveyor having said material receiving end portion in said opening and said delivery end portion adjacent the axis of pivotal movement of the receiver relative to said frame structure.

7. The harvesting machine defined in claim 1 in which said conveying and treating mechanism includes a blower mounted on said mobile frame structure in spaced relation to said receiver, and conduit means between said blower and the implement for receiving material discharged from the implement, said conduit means including a pair of conduit sections one each carried by a different one of said blower and receiver, and a connecting portion pivotally connecting said sections for relative rotation on the axis of pivotal movement of said receiver.

8. The harvesting machine defined in claim 1 in which said conveyor comprises an endless belt.

* * * * *